United States Patent
Parsons

(10) Patent No.: US 11,851,262 B2
(45) Date of Patent: Dec. 26, 2023

(54) MOISTURE RETAINING REUSABLE VEGETATION SAC

(71) Applicant: Nicole I. Parsons, Cloverdale, CA (US)

(72) Inventor: Nicole I. Parsons, Cloverdale, CA (US)

(*) Notice: Subject to any disclaimer, the term of this patent is extended or adjusted under 35 U.S.C. 154(b) by 0 days.

(21) Appl. No.: 17/890,933

(22) Filed: Aug. 18, 2022

(65) Prior Publication Data

US 2023/0122046 A1 Apr. 20, 2023

Related U.S. Application Data

(60) Provisional application No. 63/234,562, filed on Aug. 18, 2021.

(51) Int. Cl.
*B65D 81/22* (2006.01)
*B65D 33/00* (2006.01)
*B65D 85/50* (2006.01)

(52) U.S. Cl.
CPC ............ *B65D 81/22* (2013.01); *B65D 33/00* (2013.01); *B65D 85/50* (2013.01)

(58) Field of Classification Search
CPC .. A01G 5/06; A01H 4/00; A01H 4/001; A47F 3/04; A47F 3/0439; B65D 33/00; B65D 81/22; B65D 85/50; B65D 85/52
USPC ...................................... 206/205, 423; 47/84
See application file for complete search history.

(56) References Cited

U.S. PATENT DOCUMENTS

| | | | | |
|---|---|---|---|---|
| 2,071,850 A | * | 2/1937 | Miller | A47G 25/54 206/205 |
| 4,034,118 A | * | 7/1977 | Martin | A23L 19/03 206/205 |
| 4,189,868 A | * | 2/1980 | Tymchuck | A01H 4/001 47/84 |
| 5,957,277 A | * | 9/1999 | Elliott | A24F 25/02 206/205 |
| 2006/0060486 A1 | * | 3/2006 | Castleberry | A01G 24/48 206/423 |
| 2006/0213123 A1 | * | 9/2006 | Larsen | A01G 24/28 47/64 |
| 2011/0192747 A1 | * | 8/2011 | Schmidt | B65D 85/505 206/423 |
| 2016/0176622 A1 | * | 6/2016 | Vertsteylen | A61G 17/047 206/205 |
| 2019/0155243 A1 | * | 5/2019 | Ino | G05B 19/058 |

* cited by examiner

*Primary Examiner* — Bryon P Gehman
(74) *Attorney, Agent, or Firm* — POLSINELLI LLP

(57) ABSTRACT

A moisture-retaining vegetation container is provided. The container may include an outer layer of a non-porous material that is impermeable to moisture. The outer layer may further be configured to enclose an interior space. The container may further includes one or more inner layers configured to fit within the interior space enclosed by the outer layer. The inner layers may include at least one absorbent material capable of absorbing a liquid and releasing the absorbed liquid within the interior space. At least part of the vegetation may be enclosed within the interior space, thereby allowing for continued moistening of the enclosed vegetation part during transport or other usage periods.

20 Claims, 5 Drawing Sheets

MOISTURE RETAINING REUSABLE VEGETATION SAC

CROSS-REFERENCE TO RELATED APPLICATIONS

The present patent application claims the priority benefit of U.S. provisional patent application No. 63/234,562 filed Aug. 18, 2021, the disclosure of which is incorporated by reference herein.

BACKGROUND OF THE INVENTION

1. Field of the Invention

The present disclosure is generally related to moisture retention. More specifically, the present disclosure is related to moisture retaining reusable vegetation sacs.

2. Description of the Related Art

Transportation of harvested vegetation poses several problems when considering the lifespan of the vegetation after separation from a plant. Flowers, some vegetables, and herbs may lose moisture rapidly after being cut from the stem, stalk, or root from which they were grown. A loss of moisture in cut flowers, vegetables, and herbs may decrease the quality and freshness of the product by the time that the product arrives at a destination. Further, transporting such fresh product may include dirt and debris that was not removed in the harvest process that may need to be cleaned by the transporter. Dirt and moisture may make transporting such product cumbersome and awkward.

To retain moisture and prevent debris from spreading en route, typical transportation of flowers, vegetables, or herbs may utilize a plastic bag to hold the vegetation. A plastic bag may not retain moisture adequately and plants may still dry out. Additionally, plastic bags easily slip and fall off the plants if there is not enough moisture. Plastic bags also may not be reusable and may typically be thrown away after a single use. Such bags may be a single size which do not adequately fit many flowers, vegetables or herbs that may be grown in a variety of sizes.

There is therefore a need in the art for improved systems and methods of retaining and delivering moisture to vegetation.

SUMMARY OF THE CLAIMED INVENTION

Embodiments of the present invention include a moisture-retaining vegetation container. The container may include an outer layer of a non-porous material that is impermeable to moisture. The outer layer may further be configured to enclose an interior space. The container may further includes one or more inner layers configured to fit within the interior space enclosed by the outer layer. The inner layers may include at least one absorbent material capable of absorbing a liquid and releasing the absorbed liquid within the interior space. At least part of the vegetation may be enclosed within the interior space, thereby allowing for continued moistening of the enclosed vegetation part during transport or other usage periods.

DETAILED DESCRIPTION

The detailed description set forth below is intended as a description of various configurations of the subject technology and is not intended to represent the only configurations in which the technology may be practiced. The appended drawings are incorporated herein and constitute a part of the detailed description. The detailed description includes specific details for the purpose of providing a more thorough understanding of the technology. However, it will be clear and apparent that the technology is not limited to specific details set forth herein and may be practiced without these details.

Embodiments of the present invention may include moisture-retaining vegetation containers. The container may include an outer layer of a non-porous material that is impermeable to moisture. The outer layer may further be configured to enclose an interior space. The container may further includes one or more inner layers configured to fit within the interior space enclosed by the outer layer. The inner layers may include at least one absorbent material capable of absorbing a liquid and releasing the absorbed liquid within the interior space. At least part of the vegetation may be enclosed within the interior space, thereby allowing for continued moistening of the enclosed vegetation part during transport or other usage periods.

A moisture-retaining reusable sac may be manufactured in a variety of sizes and may include a variety of materials to accommodate for different plants, such as flowers, vegetables, and herbs. The moisture-retaining reusable sac may be used to transport harvested vegetation safely by containing moisture in the sac with the plant, while the outside remains dry, allowing the sac to be carried easily. The sac may be cleaned, by opening the sac and flushing the inside with clean water. After cleaning, the sac may be dried by leaving the sac open and allowing water to evaporate. To accelerate water evaporation in the drying process, the sac may have small amounts of heat applied, such as allowing the sac to dry in direct sunlight. After the sac has been cleaned and dried, the sac may be reused repeatedly, reducing waste in transportation of vegetation typically transported in plastic bags.

Figure 1:
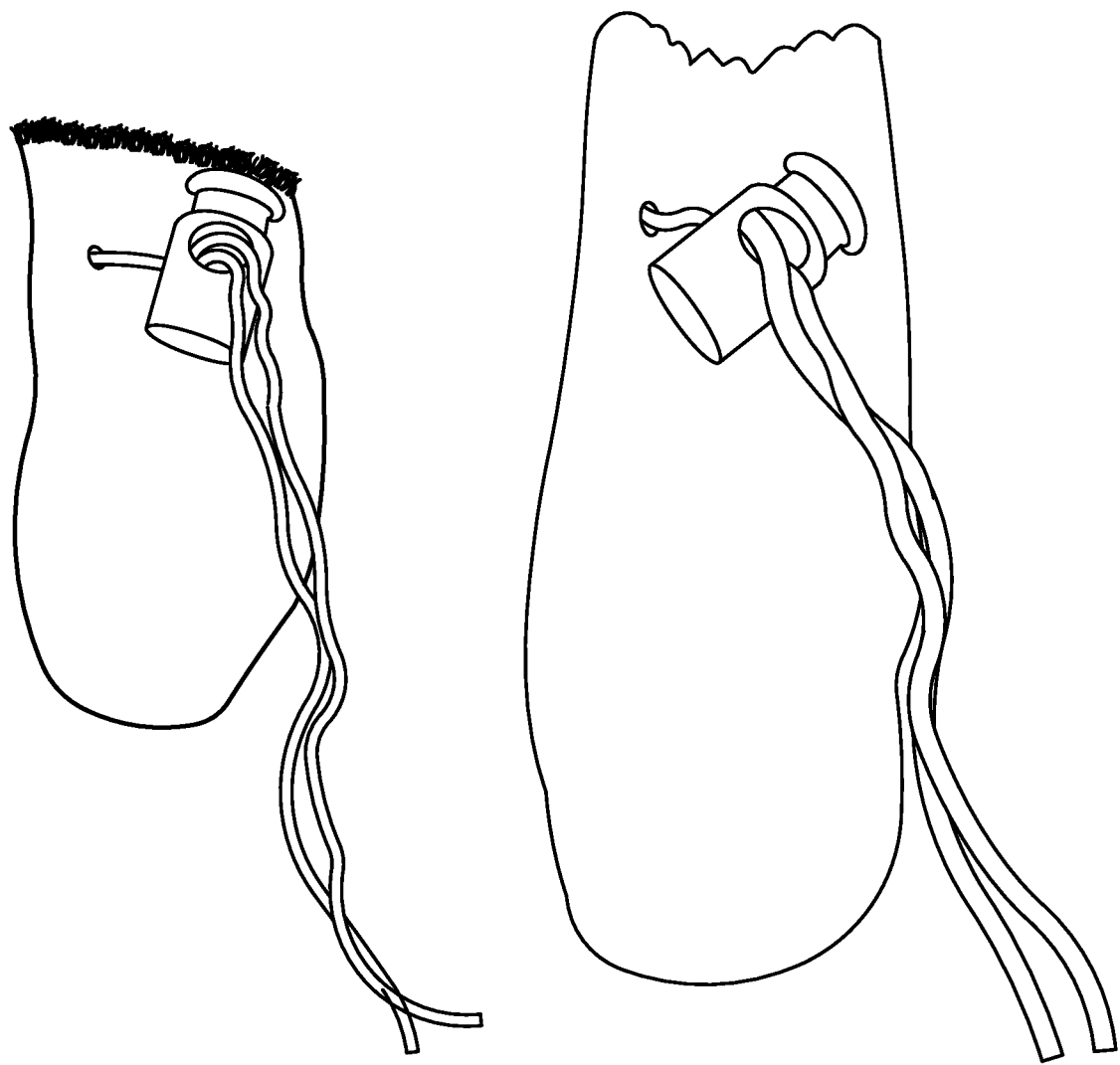
FIG. 1 is an illustration of various sizes of a moisture retaining sac.

FIG. 1 is an illustration of various sizes of a moisture retaining sac. The moisture retaining sac may be comprised of multiple different layers of different materials. As illustrated, the outermost layer of a sac may be printed, woven, dyed, or otherwise treated so as to create visual designs or patterns that personalize the sac to a choice of style for a user. Some embodiments may include translucent, clear, or transparent materials that allow for light and visibility into the interior of sac and its contents. In some embodiments, the layers may be detachable and re-attachable from each other, allowing for different combinations of inner layers and outer layers to be used together. While illustrated as being longer along one axis, other shapes and configurations may be possible. For example, the sac may include more material to allow for expansion to fit or enclose different widths of products in part or entirely within the sac. In addition, one of the layers of the sac may also include more rigid structure (e.g., scaffolding, boning) that may provide additional protection to the contents of sac.

The outer layer of the sac may be manufactured from a variety of materials. In one embodiment, the outer layer of a sac may be manufactured from silicone, rubber, or waterproof cloth treated with wax or chemicals to resist moisture and extend life of the sac for reuse. In another embodiment, the outer covering of a sac may be manufactured from biodegradable components and materials that may be composted after use. The outer layer of a sac may protect the hands of a user carrying the sac from discomfort and dirt, as stems of flowers or other plants may include thorns and debris. The outer layer of the sac may be made out of a non-porous material to prevent loss or escape of water or moisture from the inner layer of the sac.

A drawstring or other fastener may be attached to the sac and may be used to open, tighten, and partially or entirely close an opening of the sac. The drawstring may be fed through eyelets, holes, or grommets near the top edge of the sac and may be secured with metal, plastic, or rubber fixtures. The fixture of each hole may be used to pin the outer covering and inner layer of the sac together to prevent the layers from becoming dislodged during use or cleaning. The drawstring may be pulled tight and fastened with a toggle pin after inserting fresh vegetation into the top of the sac. The toggle pin may be pinched, and the drawstring may be loosened to open the sac and remove vegetation or to clean the sac.

Figure 2:
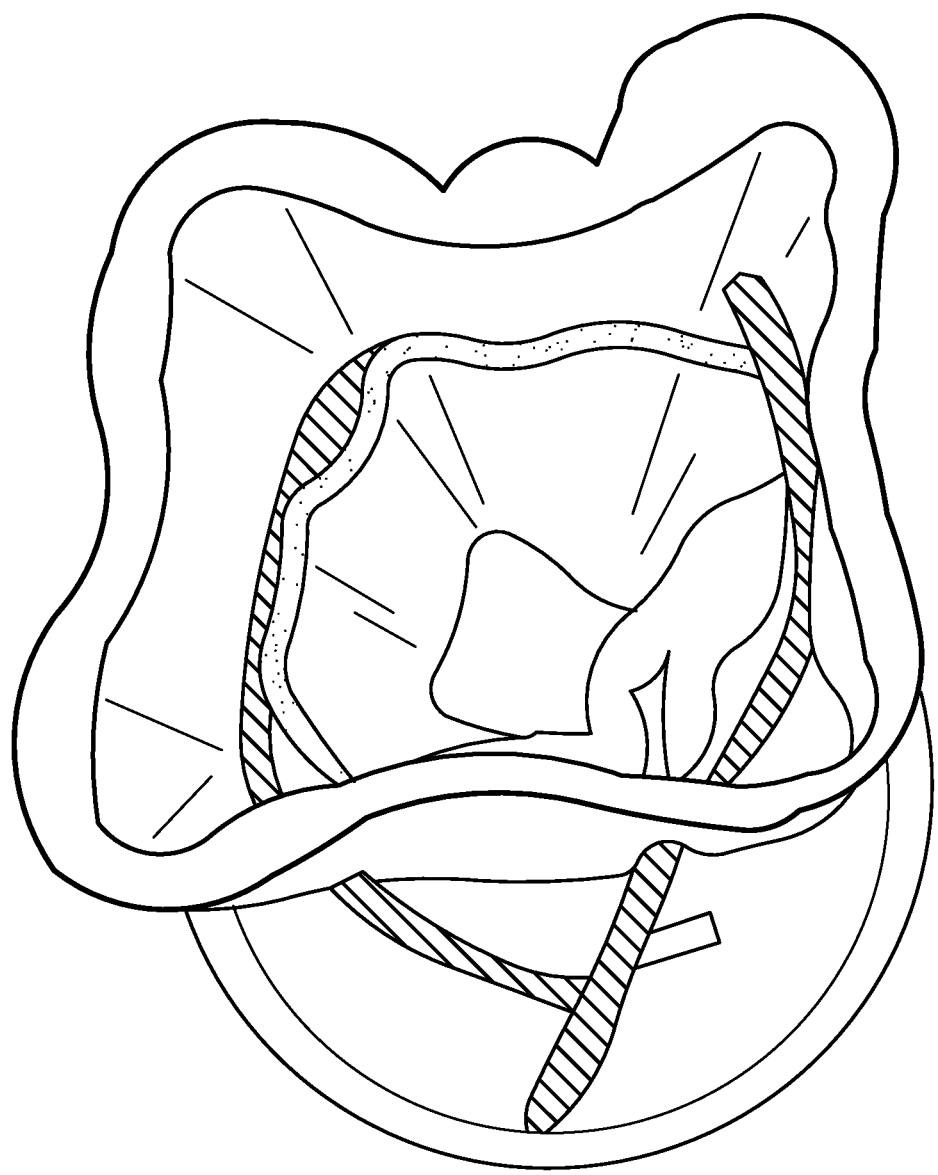
FIG. 2 is an illustration of the sac opening in a partial top-down view.

FIG. 2 is an illustration of the sac opening in a partial top-down view. The outer covering may be lined with one or more inner layers comprised of various water-absorbing and water-releasing materials. Each of the inner layers may be manufactured in a variety of configurations that allow different levels of water or moisture to be retained or carried so as to accommodate a variety of different types of vegetation that may require different amounts of water or moisture during transportation.

In one embodiment, the sac inner layers may be manufactured with moisture already present albeit contained until released, thereby allowing the first use of the sac immediately with no need to fill the sac with water for transportation. For example, the inner layer may be comprised of moisture-absorbent materials (e.g., crystals, beads, pearls, gels) that release moisture over time to keep an interior environment of the sac moist. In other embodiments, a sealed enclosure, pocket, or reservoir of water (or mixture of water, preservatives, plant food, etc.) may be built into one or more of the layers, thereby allowing a user to release its contents within the interior of the sac when the user is ready to use the same. Such pocket may be refillable, thereby allowing the user to add water or moisture for continued usage and moistening of the sac interior. In some embodiments, the pocket itself may be made of a permeable material having pores that allow moisture to be delivered over time to a remaining portion of the sac interior. Multiple pockets may be provided for holding and releasing different types of contents, including water, other liquids, dissolvable or water-soluble plant nutrients or foods, etc., over time. Each pocket may release its respective set of contents into the interior space of the sac to be mixed together. At least one set of contents may include water or other liquid (or mixture of liquids), for example, while other pockets may include yet other liquids or dissolvable or water-soluble plant nutrients or foods.

In some embodiments, a flower stem, vegetable, or herb inserted into the sac may require additional moisture. In such a case, the sac may be filled with an amount of water before inserting plants into the sac. In another implementations, a plant inserted into the sac may already be overly wet and may not require additional moisture. In this case, the sac inner layers may be left dry and wet plants may be inserted into the sac where excess moisture may be absorbed and released as the interior of the sac becomes drier. Such plants may continue to release excess water into the sac during transportation, where the inner layers may continue to absorb and release the moisture over time.

Figure 3:
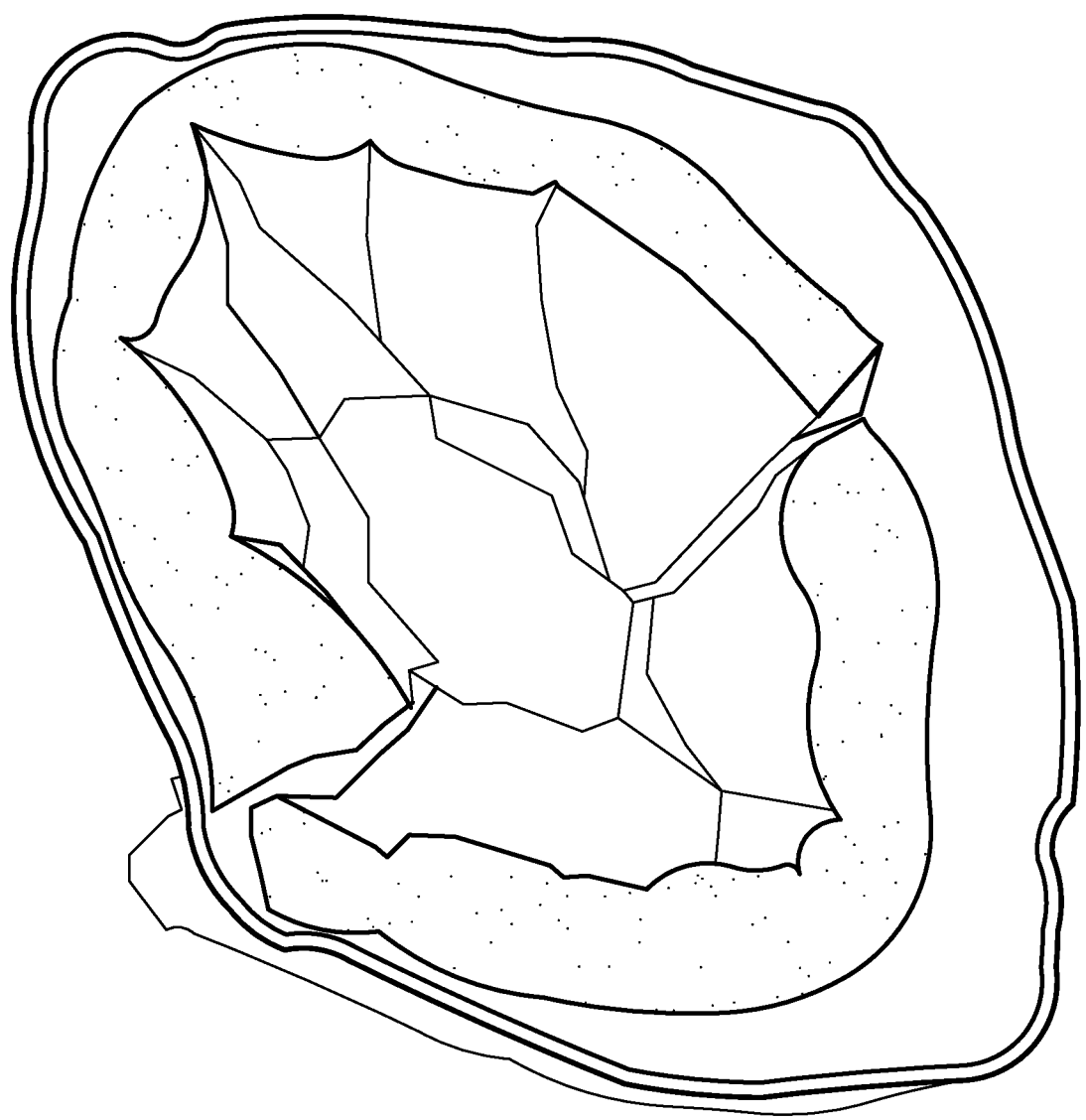
FIG. 3 is an illustration of the opening of a sac from a top-down perspective.

FIG. 3 is an illustration of the opening of a sac from a top-down perspective. The sample configuration of the sac in FIG. 3 may contain inner layers manufactured in a variety of thickness and may be made from various materials depending on the desired size of vegetation to be carried by the sac and the required moisture to transport the same vegetation. In some embodiments, the inner layers may be manufactured as sponges, water-absorbing cloth, super-absorbent polymer (SAP) spheres, or any combination therein. The inner layers also may be manufactured as biodegradable sponges, cloth, or SAP spheres, allowing parts or the entire sac to be composted.

Figure 4:
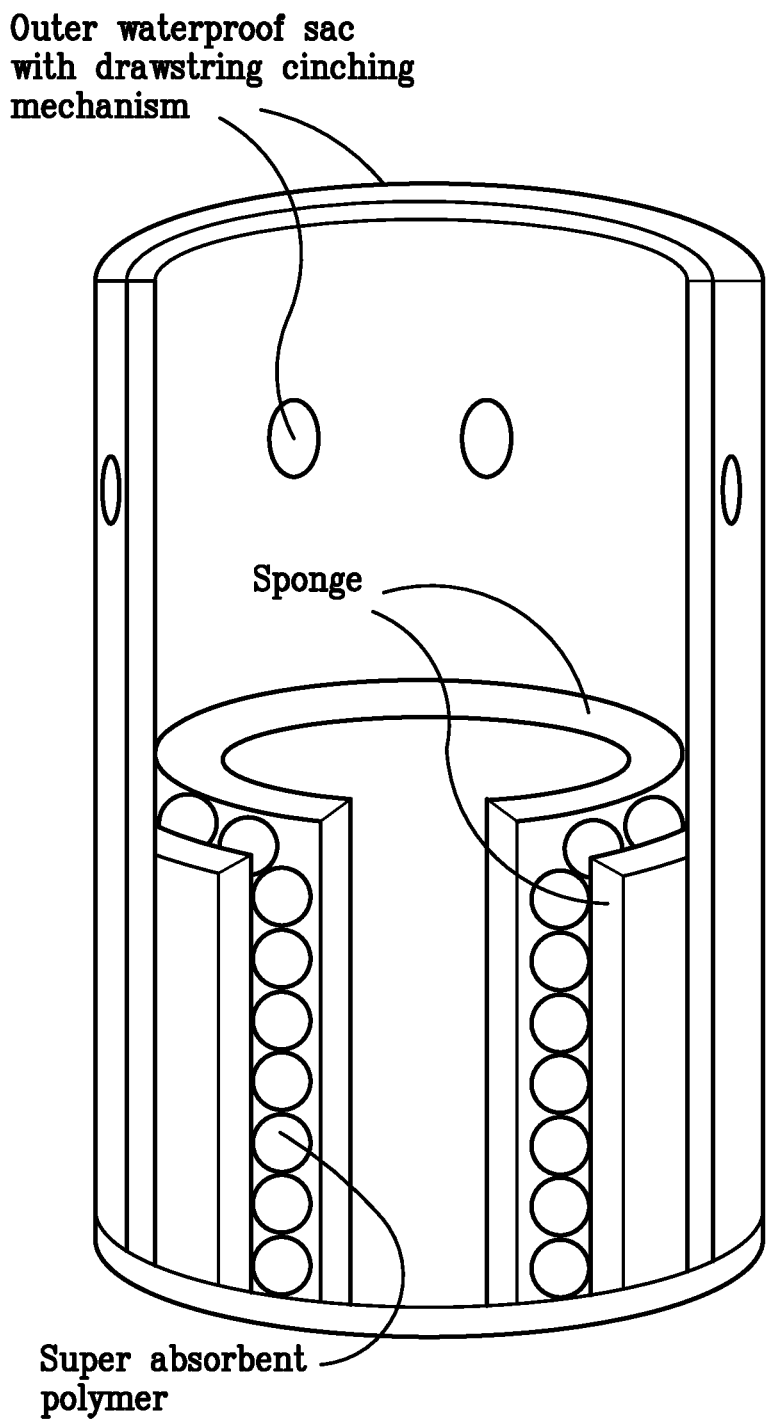
FIG. 4 is an illustration of a cross-section of a moisture-retaining reusable sac.

FIG. 4 is an illustration of a cross-section of a moisture-retaining reusable sac. Below the holes, grommets, or eyelets where a drawstring may be laced through, various inner layers may be configured. Sponges and SAP spheres may be layered multiple times to achieve the desired amount of water retention on the inside of the sac. For example, a sponge layer and a SAP layer may alternate in the inner layer or one or more sponge or cloth layers may sandwich a layer of SAP spheres. In another example, the inner layer may comprise of SAP spheres embedded inside one or more sponge or cloth layers.

In some embodiments, different sizes and configurations of SAP spheres placed in the inner layers may allow for different levels of water absorbency required to transport different varieties of vegetation. For example, a flower may benefit from being transported with the flower stem fully submerged in water. In such a case, the sac may be configured to contain only a few small diameter SAP spheres, and the sac may be filled with water prior to inserting a flower for transportation. A configuration of the sac containing few SAP spheres of small diameter may not absorb most of the water added to the sac, and a flower may have the stem fully submerged in water during transportation. In a different example, a vegetable may be harvested in wet conditions and may contain excess water. In this case, a sac may be configured with several larger diameter SAP spheres and may have no water added to the sac before inserting the vegetables. In such a configuration, the excess water from vegetables may be absorbed by the SAP spheres, avoiding vegetables being carried in overly moist conditions which may soften the vegetables or cause a faster rate of decay in the vegetables.

Figure 5:
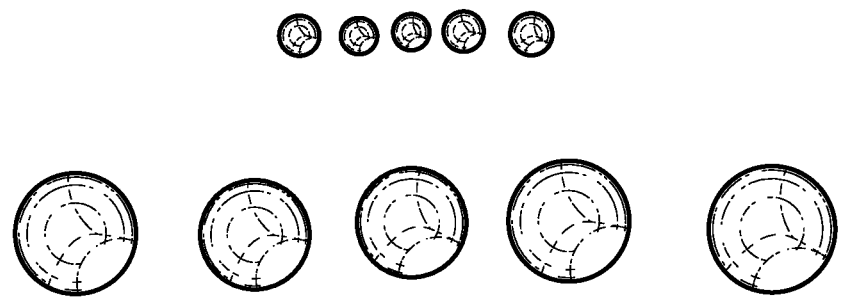
FIG. 5 is a photograph of sample sizes of super absorbent polymer spheres.

FIG. 5 is a photograph of sample sizes of super absorbent polymer spheres. Various sizes of SAP spheres may be used in the manufacturing of a sac depending on the intended size of the final product, type of vegetation to be carried, and water level that a sac is expected to absorb or hold. SAP spheres may be manufactured in any required size or a combination of sizes to provide the necessary form factor of the sac and inner layers. SAP spheres may be used to absorb water from plants and may also provide water to plants inserted in a sac. Dry SAP spheres will absorb water on contact, however SAP spheres that have been fully or partially saturated may release water under different conditions. Saturated SAP spheres may naturally release water over time back into the cavity of the sac. Water may be drawn out of the spheres through a variety of methods such as mechanical or physical agitation, compression, introducing heat to the SAP spheres, etc.

Figure 6:
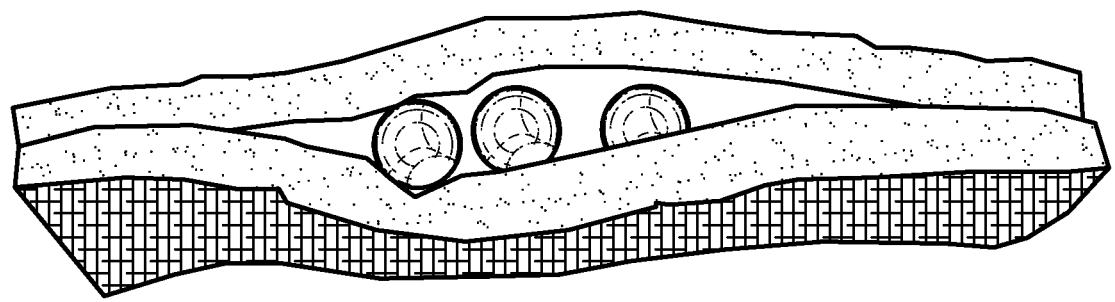
FIG. 6 is a cross-section of sponges lined with SAP spheres used in the inner layers of a moisture-retaining reusable sac.

FIG. 6 is a cross-section of sponges lined with SAP spheres used in the inner layers of a moisture-retaining reusable sac. SAP spheres are placed between the inner sponges where the spheres are locked in place once the sac is assembled for use. Additional configurations of inner layers for the sac may include various diameters of SAP spheres as depicted in FIG. 5 and may include sizes and quantity of spheres selected to optimize the use of interstitial space in the sac for inserted vegetation. The number of SAP spheres may be optimized for different moisture requirements and the required duration for storage of water.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A moisture-retaining vegetation container comprising:
   an outer layer of a non-porous material that is impermeable to moisture, wherein the outer layer is configured to enclose an interior space; and
   one or more inner layers configured to fit within the interior space enclosed by the outer layer, wherein each of the one or more inner layers includes different absorbent materials capable of absorbing a liquid and releasing the absorbed liquid within the interior space at a different level of absorption, wherein one of the one or more inner layers detaches from and reattaches to another one of the one or more inner layers.

2. The container of claim 1, wherein one of the different absorbent materials includes a sponge.

3. The container of claim 1, wherein one of the different absorbent materials includes a super-absorbent polymer.

4. The container of claim 1, wherein at least one of the outer layer or the one or more inner layers includes a pocket configured to contain an amount of the liquid.

5. The container of claim 4, wherein the pocket includes one or more pores that release the amount of the liquid into the interior space.

6. The container of claim 4, wherein the pocket is refillable to hold a newly-added amount of liquid, and wherein the pocket is resealable.

7. The container of claim 4, wherein the pocket includes at least a portion made of a permeable material that includes a plurality of pores, wherein the amount of the liquid seeps out of the pores into the interior space over time.

8. The container of claim 1, wherein at least one of the outer layer or the one or more inner layers includes a plurality of pockets each configured to separately contain a respective set of contents and to release the respective set of contents into the interior space.

9. The container of claim 1, wherein the one of the one or more inner layers detaches from and reattaches to the outer layer.

10. The container of claim 1, wherein at least one of the different absorbent materials is embedded within a material of at least one of the one or more inner layers.

11. The container of claim 1, wherein at least one of the different absorbent materials is loosely carried within the interior space.

12. The container of claim 1, wherein at least one of the different absorbent materials is configured as a plurality of spheres or crystals of different sizes.

13. The container of claim 1, further comprising a fastener that allows for at least partial closure of an opening of the outer layer around the interior space.

14. The container of claim 13, wherein the opening of the outer layer is configured to be tightened around a portion of a vegetation-based item that protrudes from the interior space.

15. The container of claim 1, wherein the outer layer includes at least a portion that is clear, wherein the clear portion allows for light and visibility into the interior space.

16. The container of claim 1, further comprising a rigid structure associated with at least one of the outer layer or the one or more inner layers.

17. The container of claim 1, wherein at least part of an amount of at least one of the different absorbent materials is removable from the interior space.

18. The container of claim 1, wherein at least one of the different absorbent materials includes a plurality of different types of absorbent materials each capable of a different level of absorption.

19. The container of claim 18, wherein a composition of the different types is adjustable to change proportions of the different types of absorbent materials.

20. The container of claim 1, wherein at least one of the different absorbent materials absorbs a portion of the liquid and release a different portion of the liquid into the interior space.

* * * * *